F. CONRAD.
SYSTEM OF ELECTRIC MOTOR CONTROL.
APPLICATION FILED SEPT. 19, 1910.
1,024,557.
Patented Apr. 30, 1912.
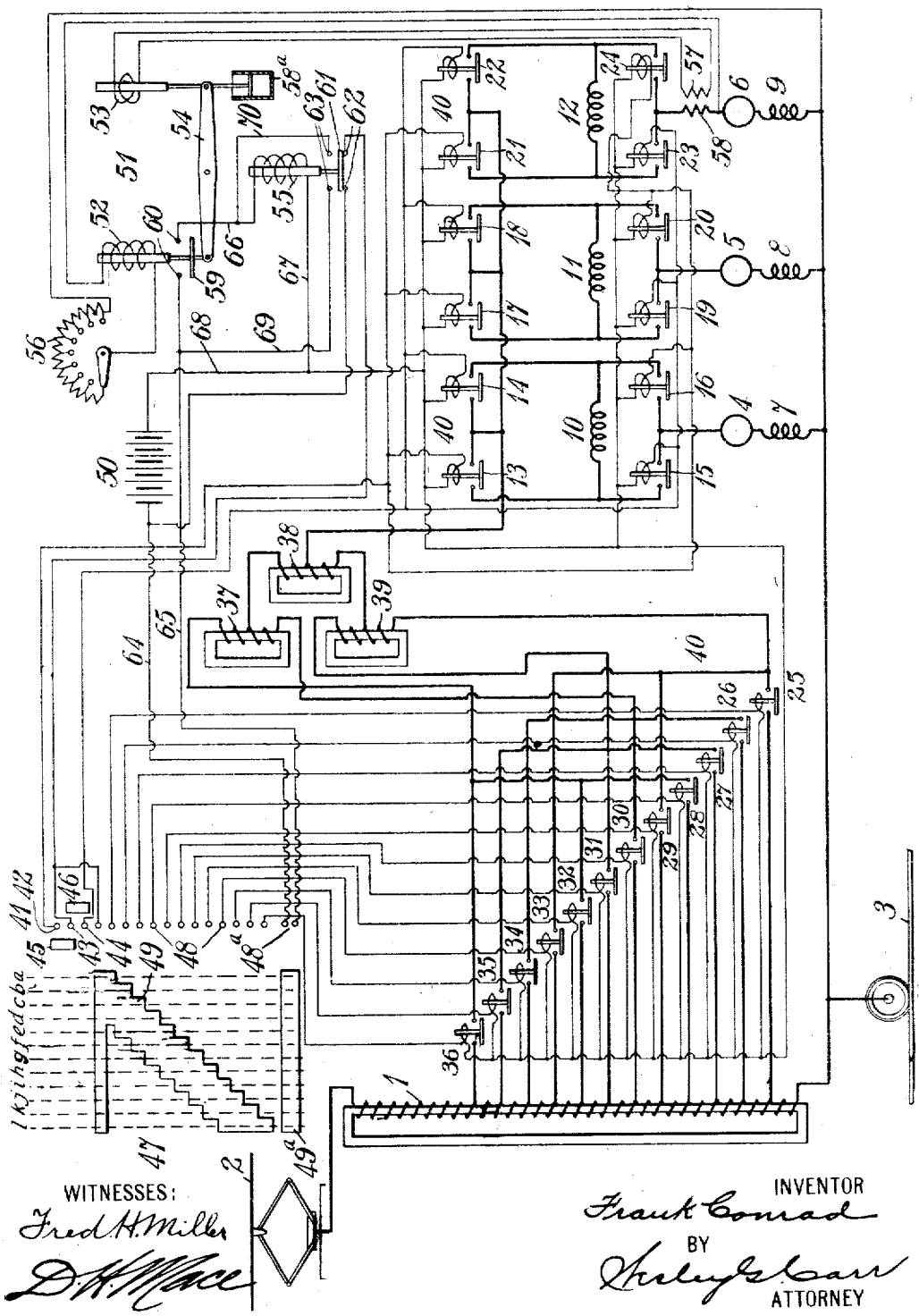
WITNESSES:
Fred H. Miller
D. W. Mace
INVENTOR
Frank Conrad
BY
Shuyler Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,024,557.     Specification of Letters Patent.     Patented Apr. 30, 1912.

Application filed September 19, 1910. Serial No. 582,675.

*To all whom it may concern:*

Be it known that I, FRANK CONRAD, a citizen of the United States, and a resident of Swissvale, in the county of Allegheny and State of Pennsylvania, have invented a new and useful Improvement in Systems of Electric-Motor Control, of which the following is a specification.

My invention relates to systems of control for electric railway motors and particularly to over-speed devices for systems of the above indicated class.

The object of my invention is to provide a system of control for electric locomotives which shall be adapted to automatically limit the speed thereof to a predetermined maximum rate, irrespective of all other conditions.

In the use of electric locomotives, structural reasons necessarily limit the maximum safe running speed, and it is a matter of utmost importance to restrict the operations within safe limitations.

Inasmuch as electric locomotives are likely to be employed in various classes of service and subjected to a variety of loading conditions, due to differences in lengths and weights of trains, it is evident that satisfactory over-speed devices which are adapted for such service, must be dependent upon speed alone.

It is well known in the art that the speed of an electric motor is directly proportional to the voltage applied to its armature and inversely proportional to the field current; in other words, the speed of a motor depends upon the relative values of the armature voltage and the field current. Thus, the speed varies as the ratio of armature voltage to field current, or S varies as $$\frac{V}{C}$$

Obviously, a particular speed is not determined by particular values of voltage and field current, so long as the ratio between them remains constant, but any deviation from this fixed ratio results in a change in speed. An increase in the ratio causes a corresponding increase in speed, while a reduction in the ratio effects a decrease in speed.

According to my invention, I embody the fundamental principles to which reference has been made, in a suitable over-speed device which depends for its action upon the relationship of armature voltage to field current and which is so constructed and connected to the usual control system, as to effectively serve the purpose specified. Furthermore, I provide means which necessitates that the master controller be brought to its "off" position, subsequent to the action of the over-speed device, before voltage can again be applied to the motors.

My invention is illustrated in the accompanying drawing, which is a diagrammatic view of the circuit connections of a system of control for electric motors which embodies my invention.

It should be understood that the portion of the system illustrated, which is adapted to control the operation of the motors, is shown only as illustrative of such a system as may be equipped with the speed-limiting device of my invention. My invention is not confined to any specific control system, but may be employed with any type of system which is adapted to govern the operation of electric motors.

Referring to the accompanying drawing, the system comprises a main subdivided auto-transformer winding 1 which is supplied with energy from a suitable circuit, such as a trolley conductor 2 and a track rail 3; a plurality of electric motors of the commutator type, having armatures 4, 5 and 6, respectively, compensating windings 7, 8 and 9, respectively, and main field magnet windings 10, 11 and 12, respectively, a set of switches 13 to 24, inclusive, for governing the direction of rotation of said motors; a second set of switches 25 to 36, inclusive, for adjusting the circuit connections of the motors with the auto-transformer winding 1; a set of choke coils 37, 38 and 39, arranged as set forth in Patent No. 834,525, granted October 30, 1906, to the Westinghouse Electric & Manufacturing Co., as assignee of Ray P. Jackson, for the purpose of preventing injurious arcing at the switches 25 to 36, inclusive, as the motor connections with the auto-transformer are effected; a plurality of operating or controlling magnets 40 to cause the operation of said switches; a reversing switch 41 to control the operation of switches 13 to 24 inclusive, said reversing switch comprising stationary contact terminals 42, 43 and 44 and movable contact segments 45 and 46 to coöperate therewith; a master controller 47 for governing the operation of the motors, said master controller comprising a plurality of stationary contact terminals 48, and a movable contact segment 49 to coöperate with said stationary terminals upon the position-indicating lines *a* to *l*, inclusive; an auxiliary interlocking means for a purpose hereinafter explained, said means comprising a movable conducting segment 49ª, independently associated with master controller 47, and stationary contact terminals 48ª; a battery, or other suitable source of energy 50 from which the operating magnets 40 receive their excitation; an over-speed limiting device 51, adapted to interrupt the application of energy to the motors under predetermined speed conditions and comprising relay coils 52, and 53, respectively, dependent upon the armature voltage and field current of one of the motors, and a pivotally supported member 54, adapted to connect the movable cores of said relay coils; and an auxiliary relay coil 55 which is dependent upon the action of said over-speed limit device 51 and the auxiliary interlocking means associated with said master controller for the purpose of preventing further application of energy to the motors until the master controller 47 has been returned to its "off" position.

It will be evident to those skilled in the art that, below a certain maximum allowable speed, the operation of the over-speed device which embodies my invention is independent of the rest of the system, in the sense that it interferes in no way with the operation of that portion of the system which governs the operation of the motors; hence, a brief outline of the operation of the motor-governing portion of the system may be given without further mention of said over-speed device.

In the operation of the system, the reversing switch 41 may be caused to operate in either direction for governing the direction of rotation of the motors. If forward rotation is desired, contact segment 45 is caused to engage stationary contact terminals 42 and 43, thereby causing the control magnets 40 of switches 13, 16, 17, 20, 21 and 24 to be energized and said switches to be closed. For reverse operation, contact segment 46 is caused to engage stationary contact terminals 43 and 44, in which position the controlling magnets 40 of switches 14, 15, 18, 19, 22 and 23 are energized and the closure of said switches effected. The drum of master controller 47 is then moved into successive engagement with the contact terminals 48, until the desired voltage is applied to the motors. Conducting segment 49 is so constructed that in the position *a*, it causes switch 25 to be closed and, in the positions *b*, *c* and *d*, it causes the closure of switches 26, 27 and 28, respectively. As the master controller is moved through the succeeding positions *e* to *l*, switches 29 to 36, inclusive, are closed in succession, and switches 25 to 32, inclusive, are successively opened. Since this portion of the system is fully described in the above mentioned Patent No. 834,525, no further detailed description of the system is considered necessary.

Reference may now be had to the overspeed device 51. The relay coil 52 or the so-called "voltage coil" is connected across the armature 6 and compensating winding 9 and hence its energization is dependent upon the voltage applied to said armature and compensating winding. For the purpose of adjustment, a variable non-inductive resistance 56 is connected in circuit with said relay coil. Relay coil 53 is the so-called "current coil" and is connected to a secondary winding 57 of a series transformer, the primary winding 58 of which is in series circuit with the field magnet winding 12, armature 6 and compensating winding 9. Hence, the action of said coil is dependent upon the field current which, in this case, also traverses the armature. One end of connecting member 54 is provided with a dash pot 58ª, of usual construction, to dampen out any undue vibrations, and the other end of said connecting member is provided with a switch member 59 which engages a set of stationary contact terminals 60, under predetermined speed conditions. Auxiliary relay coil 55 is provided with a switch member 61, which, under normal speed conditions, bridges stationary contact terminals 62, but which makes contact with upper contact terminals 63 when said relay is energized.

In order to adjust the over-speed device for any predetermined critical speed, a determination of the relative values of armature voltage and field current to produce the desired speed, is necessary. Having ascertained the ratio between armature voltage and field current to produce the particular speed for which the device is to be set, the over-speed device 51 is adjusted by means of weights (not shown) and the variable resistance 56, so that the effect of the "voltage coil" 52 shall be slightly in excess of that of the "current coil" 53, when said critical speed is attained. Hence, it is evident, since a particular speed is dependent upon the ratio between the armature voltage and field current, and not dependent upon particular values of said voltage and current, that, whenever the locomotive attains the critical speed for which the over-speed device is adjusted, the effect of the "voltage coil" 52 will overbalance that of the "current coil" 53, thereby causing switch member 59 to make contact with stationary contact terminals 60.

Assuming the various pieces of apparatus and circuit connections to be as shown in the diagram, the operation of the over-speed device in actual service is as follows: As the locomotive is started from rest, a heavy current is applied to the motors at a low voltage, hence the pull exerted by the "current coil" 53 is in excess of that of the "voltage coil" 52. As the speed of the locomotive gradually increases, the voltage applied to the motors is likewise increased and the motor current gradually decreases until such conditions are produced that the effect upon the "voltage coil" 52 of the voltage applied to the motors predominates over the pull exerted by the "current coil" 53, indicating that the critical speed is attained. Switch member 59 then closes upon contact terminal 60, thereby establishing a circuit from the positive side of battery 50, through conductor 64, one of contact terminals 48ª, conducting segment 49ª, other contact terminal 48ᵇ, conductor 65, switch member 59, conductor 66, auxiliary coil 55, conductor 67 and conductor 68 to the negative side of the battery. The completion of this circuit causes relay coil 55 to be energized and switch member 61 to be disengaged from contact terminals 62 and to make contact with contact terminals 63. As the switch member 61 disengages its contact terminals 62, the main control circuit, from the positive side of the battery 50 to the master controller, is interrupted and all of the control magnets 40 are thereby deënergized, causing all of the switches to be opened and the application of voltage to the motors to be discontinued.

It will be observed that as switch member 61 makes contact with upper contact terminals 63, a shunt circuit around the switch member 59 is established through conductor 69, switch member 61 and conductor 70. Thus, the auxiliary relay 55 continues to be energized, irrespective of the subsequent operation of the over-speed device 51, until the master controller 47 is moved into its "off" position and the energizing circuit interrupted.

The various circuits of the system and the structural details of the devices for arranging the circuit connections may obviously be modified considerably, within limits, without departing from the spirit and scope of my invention, and I desire that only such limitations shall be imposed as are indicated in the appended claims.

I claim as my invention:

1. In a system of control, the combination with a source of energy, an electric motor having a field magnet winding and an armature winding, means for controlling the energy applied to said motor and means dependent on armature voltage and field current for limiting the speed of said motor to a predetermined value, of means dependent upon the operation of said last named means for affecting the operation of said controlling means.

2. In a system of control, the combination with a source of energy, a plurality of electric motors, means for controlling the energy supplied thereto and means dependent upon predetermined speed conditions for causing a change in the supply of energy, of means for rendering further changes in the supply of energy dependent upon predetermined conditions.

3. In a system of control, the combination with a source of energy, an electric motor having a field magnet winding and an armature winding, means for controlling the energy applied to said motor, and electro-responsive means dependent upon the ratio of armature voltage to field current for effecting a change in the supply of energy, of means dependent upon said electro-responsive means for causing further changes in the supply of energy to be dependent upon predetermined conditions.

4. In a system of control, the combination with a source of energy, an electric motor, circuit-controlling means for governing the energy supplied to said motor, and electro-responsive means dependent upon predetermined speed conditions for interrupting the supply of energy, of means dependent on said electro-responsive means for rendering further supply of energy dependent upon a predetermined operation of said circuit-controlling means.

5. The combination with an electric motor and means for controlling the operation thereof, of a plurality of relay coils respectively responsive to armature voltage and field current and adapted to act in opposition at the opposite ends of a pivotally mounted arm, and a third relay coil dependent upon the resultant operation of the aforesaid relay coils for interrupting the supply of energy to said motor.

6. The combination with an electric motor, means for controlling the operation thereof and an overspeed limit device comprising two relay coils arranged in opposition and respectively responsive to armature voltage and field current and a third relay coil dependent for energization upon the resultant operation of said opposing coils for interrupting the supply circuit of said motor, of means associated with said third relay coil for rendering its deënergization independent of the subsequent action of said over-speed limit device.

7. An over-speed limit device for electric motors comprising two opposed relay coils, respectively responsive to different electrical circuit conditions, a third relay coil adapted to effect the interruption of energy to said motors in accordance with a predetermined resultant operation of said opposed relay coils, and means for rendering the further operation of said third relay coil independent of the action of said opposed relay coils.

8. In a system of control, the combination with a source of energy, a plurality of electric motors having armature windings and field magnet windings, and a circuit-controlling device for governing the energy applied to said motors, of means responsive to armature voltage and field current for interrupting the energy applied to said motors under predetermined speed conditions and separate means for preventing further application of energy to said motors until said circuit-controlling device is moved to its "off" position.

9. The combination with a plurality of electric motors having armature windings and field magnet windings, and a unit switch control system adapted to govern the operation of said motors of relay coils respectively dependent for energization upon armature voltage and field current, a pivotally supported connecting member, the opposite ends of which are pivotally secured to the movable core members of said relay coils, and means for interrupting the auxiliary control circuit under predetermined unbalanced conditions of said relay coils.

10. The combination with a source of energy, a plurality of electric motors, a plurality of unit switches adapted to establish circuit connections for said motors, an auxiliary control system adapted to operate said unit switches and a controlling device for arranging circuit connections of said auxiliary control system, of two relay coils arranged in opposition, said coils being respectively responsive to armature voltage and field current, a switch member associated with said relay coils and dependent for its operation upon the resultant action of said coils, means associated with said switch member for interrupting said auxiliary control circuits under predetermined speed conditions and means for maintaining the interruption of said circuits until said controlling device is moved to its "off" position.

11. An over-speed limit relay for electric motors comprising two relay coils arranged in opposition, said coils being respectively responsive to armature voltage and field current, a third relay coil associated with said opposing coils and dependent for energization upon the resultant action of said opposing coils, and a switch member associated with said third relay coil and adapted to cause the interruption of energy applied to said motors under predetermined speed conditions.

In testimony whereof, I have hereunto subscribed my name this 12th day of Sept., 1910.

FRANK CONRAD.

Witnesses:
WILLIAM BRADSHAW,
B. B. HINES.